United States Patent [19]

Carroll et al.

[11] Patent Number: 4,654,216

[45] Date of Patent: Mar. 31, 1987

[54] BREAD ANTISTALING METHOD

[75] Inventors: John O. Carroll, Norwalk, Conn.; Columbus O. L. Boyce, Brewster, N.Y.; Theodore M. Wong, Bethel, Conn.; Charles A. Starace, Carmel, N.Y.

[73] Assignee: Novo Laboratories, Inc., Wilton, Conn.

[21] Appl. No.: 760,877

[22] Filed: Jul. 31, 1985

[51] Int. Cl.$^4$ .............................................. A21D 8/04
[52] U.S. Cl. ......................................... 426/20; 435/202; 435/204; 435/210; 426/28; 426/64
[58] Field of Search ................. 435/210, 204, 202; 426/20, 64, 28

[56] References Cited

U.S. PATENT DOCUMENTS

| | | | |
|---|---|---|---|
| 2,615,810 | 10/1952 | Stone | 426/20 |
| 2,665,215 | 1/1954 | Gray | 435/202 X |
| 3,026,205 | 3/1962 | Stone | 426/64 X |
| 3,795,584 | 3/1974 | Mitsuhashi et al. | 435/202 X |
| 3,838,006 | 9/1974 | Hijiya et al. | 435/210 X |
| 3,922,196 | 11/1975 | Leach et al. | 435/210 X |
| 4,011,137 | 3/1977 | Thompson et al. | 435/202 X |
| 4,211,842 | 7/1980 | Marshall | 435/210 |
| 4,299,848 | 11/1981 | De Stefanis et al. | 426/20 |
| 4,318,989 | 3/1982 | Marshall | 435/210 X |
| 4,320,151 | 3/1982 | Cole | 426/20 X |
| 4,355,110 | 10/1982 | Line et al. | 435/210 |
| 4,560,651 | 12/1985 | Nielsen et al. | 435/210 X |

*Primary Examiner*—Joseph Golian
*Attorney, Agent, or Firm*—Fidelman, Wolffe & Waldron

[57] ABSTRACT

Retardation of bread staling and avoidance of gummy mouthfeel by incorporation of 0.25–5 SKB units/100 grams of cereal or bacterial alpha-amylase and 10–50 PUN of a pullulanase per 100 grams of flour in the dough.

4 Claims, No Drawings

"BREAD ANTISTALING METHOD

This invention relates to retardation of staling in baked goods and to the enzyme composition employed for such purpose.

INTRODUCTION

It has long been recognized that significant commercial advantages can accrue from extending the shelf-life of pre-packaged bakery products beyond the conventional 6-7 days limit given for sale of such products.

The staling phenomena has been thoroughly investigated by the art, and many approaches toward retardation of staling have been proposed to the art. One approach in particular, namely, addition of bacterial alpha-amylase, to the dough has succeeded in increasing shelf-life of bread and rolls 3-4 days. The details of this prior art approach to anti-staling may be found in U.S. Pat. Nos. 2,615,810 and 3,026,205 to Irwin M. Stone and in "Heat-Stable Bacterial Alpha-Amylase in Baking" by O. Silberstein, Baker's Digest, Vol. 38, No. 4, pp. 66-70, 72 (August 1964), all being incorporated by reference herein.

Notwithstanding the successful anti-staling results obtainable by inclusion of an alpha-amylase in the dough, bakers largely, if not entirely, have declined to adopt the enzyme additive approach suggested by the above-referenced patents.

The bakers have a reasonably valid basis for doing so. An ordinary (family) customer can be expected to purchase a loaf of bread every 3 or 4 days, say 100 loaves per year, each baked from a different batch of dough. In the usual statistical pattern, almost all of the bread purchased by any one customer is quite fresh, which is to say, that the customer could not ascertain any difference between bread with or without alpha-amylase. Only occasionally would any one customer happen to purchase a loaf of bread that would have begun to stale absent presence of alpha-amylase therein. If the bread is dated, the baker receives no blame for supplying stale bread. The customer blames himself or herself or the store. If, however, bread is overtreated with alpha-amylase, the mouthfeel becomes somewhat gummy almost immediately, and is unacceptable to discerning tasters. Thus, the bakers probably recognized that even a single human or mechanical failure that led to addition of an excess of enzyme in a single batch of dough is likely to result in loss of many faithful coustomers. This risk of loss could be considered far too high for prudent businessmen to hazard for the relatively minor savings received from increased shelf-life.

The risk is quite great because the consequences from alpha-amylase addition to dough are relatively sensitive to baking temperature and to emzyme dosage. The range of 0.25-2 SKB alpha-amylase units per 100 gm of flour suggested in the above-referenced patents is reasonable for anti-staling purposes of properly baked loaves.

Unfortunately, if (as is most likely to happen some day) some baker's assistant adds the wrong size enzyme tablet for a batch of dough or assumes that more is better and adds three enzyme tablets instead of one tablet so as to dose 6 SKB units per 100 gm of dough, the resulting bread will exhibit a gummy mouthfeel. Even 3 SKB units/100 gram of dough imparts a slight gumminess.

Overdosing can arise purely through mechanical failure. The 0.25-2 SKB alpha-amylase units per 100 grams of flour is predicated upon an assumption that during baking, the interior of the bread will become subjected to a temperature level that largely, but not entirely, inactivates the thermostable alpha-amylase. The residual alpha-amylase activity prevents bread staling. Unfortunately, a temperature band exists, within which acceptable bread can be baked without deactivating enough of the alpha-amylase. Failure in this regard allows an excessive degree of enzymatic action to take place until the bread is consumed or otherwise destroyed. The gummy taste is generated while the bread lies on the supermarket shelf.

Despite the many precautions that can be taken to prevent overdosing with the enzyme, and to avoid underbaking, some failure that results in placement of overdosed bread onto the supermarket shelf is quite possible.

However, if the consequence of modifying baked goods with alpha-amylase can be altered to eliminate any liklihood of producing gummy baked goods that appear to be normal baked goods, the usual quality controls in the baking industry can be relied upon to prevent overdosed goods from reaching the supermarket shelf.

The object of this invention is to provide a combination enzyme anti-staling treatment less sensitive to dosage levels than treatment with alpha-amylase alone.

RATIONALE OF THE INVENTION

Studies on bread-staling have indicated that the amylose and amylopectin in bread crumb, principally the amylpectin, are involved in staling. Apparently, retrograde reactions cause the carbohydrate chains of the amylopectin to associate or align over a period of time generating the firmness and reduction in soluble dextrins that characterize stale crumb. Employment of cereal or bacterial alpha-amylase in the dough results in an increase in the amounts of dextrin which can be extracted from bread crumb, and a decrease in the average chain length of extracted dextrin. Clearly, the hydrolytic capability of the alpha-amylase affects the bread crumb. The increment of extracted dextrins generated by presence of the alpha-amylase appear to be mainly branched-chain carbohydrates.

It has been postulated that the extractable branched dextrins generated from the amylose and/or amylopectin by the alpha-amylase interfere with retrogradation, and/or that they themselves do not retrograde, thereby acting to reduce the increased firmness associated with stale bread crumb. The gumminess associated with the use of too much alpha-amylase is believed by the inventors hereof to be generated by high levels of certain relatively low-molecular weight branched dextrins in the bread crumb.

In particular, it is believed by the inventors hereof that glucose polymers in the DP 10-100 (degree of polymerization) cause the gumminess. It is also believed that the extractable dextrins generated in the bread crumb through action of alpha-amylase during baking and subsequently disproportionately comprise glucose polymers of DP 10-100. Their reasoning is drawn from the corn syrup art. During enzymatic hydrolysis of starch slurries to generate a dextrin solution, the alpha-amylase hydrolyzes the starch rapidly to low molecular weight dextrins, then far more slowly to DP 1-10 glucose polymers. Largely, the alpha-amylase is unable to degrade relatively low molecular weight branched chain dextrins.

If the amylose and amylopectin of the dough and bread crumb were in a solution rapid hydrolysis of these high DP glucose polymers to ever lower DP polymers with a cessation (or slow-down) against complete hydrolysis whenever a refractory branched chain dextrin molecule is liberated would generate a solution heavily concentrated in the DP range of the refractory branched chain dextrins, i.e., the DP 10–100. Since the alpha-amylase does generate hydrolysis products in the bread crumb, a relative concentration of the DP 10–100 branched chain dextrins might occur, and the extractable branched chain carbohydrates found in bread crumb are believed to constitute in part the DP 10–100 dextrins refractory to hydrolysis by alpha-amylase.

The gummy mouthfeel which occurs only with high doses of alpha-amylase may be related to generation of the refractory 10–100 branched chain dextrin in elevated proportions, thereby explaining the appearance of gumminess in bread crumb upon addition of high alpha-amylase dosages to the dough.

It might follow that addition to the dough of an enzyme effective against low molecular weight dextrins will prevent generation of gumminess in alpha-amylase treated bread crumb. Treatment with an enzyme mixture of cereal or bacterial alpha-amylase and a debranching enzyme does, in fact, result in non-gummy bread crumb.

BRIEF STATEMENT OF THE INVENTION

Briefly stated, the process of this invention comprises adding to the dough an enzyme mixture of cereal or bacterial alpha-amylase and a pullulanase in proportions of from 0.25–5 SKB (alpha-amylase units) and 5–75 PUN (debranching enzyme units) preferably 10–50 PUN per 100 gms of flour. The enzyme mixture is novel.

A preferred range is 0.5–3 SKB units and 10–50 PUN per 100 gms of flour. A best mode exemplary mixture is 1 SKB unit and 10 PUN per 100 grams of flour. An enzyme mixture containing a ratio of 3–15 PUN per SKB is well adapted for practice of this invention.

DISCUSSION OF THE INVENTION

It is repeated that 1 SKB unit of microbial alpha-amylase alone per 100 gm of flour will retard staling. The difficulty facing the art is absence of fail-safe assurance that an adequate dosage will not be exceeded widely either through human error or through some baking oven malfunction.

A dosage of 2 SKB units per 100 gms of flour in the dough produces completely acceptable baked goods, but at 3 SKB units, a gummy mouthfeel becomes noticeable. At 4 or 5 SKB units, the bread becomes unacceptable to discerning consumers. Thus, with alpha-amylase alone, little margin for error exists. The usual quality controls in large bakeries will not for certain cause rejection of enzyme treated bread until a dosage equivalent to about 6 SKB units per 100 gms than has been used. At such level the baked goods exhibit poor grains, i.e., grains which are open, coarse with large holes and thich walls. Until such high level of enzyme treatment, crust color, character of crust, color of crumb, aroma do not change. Unfortunately, gummy mouthfeel develops rapidly when enzyme treatment is in the 3–6 SKB range.

Addition of alpha-amylase enzyme in the 0.5–2 SKB enzyme treatment range with or without presence of debranching enzyme does not adversely affect the properties of the baked goods with indication that bread softness is improved. When treatment by alpha-amylase is within the 3–6 SKB range, presence of the pullulanase eliminates generation of the gummy muthfeel.

Practice of this invention is well adapted to providing bakers with standardized mixed enzyme compositions. The dosage proportion of alpha-amylase to the debranching enzyme is in the proper direction, being reasonably direct, i.e., the more alpha-amylase, the more pullulanase should be employed. Accordingly, an optimum enzymes proportion, e.g., 1 SKB unit to 10 PUN units, may be selected and such an enzyme mixture tabletted together to provide the desired dosage per tablet. Then, if inadvertently, an excess of alpha-amylase is incorporated in a particular batch to dose, for example, 3–4 SKB units of alpha-amylase per 100 gms of flour, an appropriately high 30–40 PUN of the debranching enzyme has been included as well. The dosage of about 6 SKB units is at the margin of where presence of debranchng enzyme fails to alleviate gumminess. In one test study, 50 PUN/100 gms successfully prevented generation of the gummy mouthfeel from 6 SKB of alpha-amylase. Yet, higher levels of 100 and 150 PUN per 100 gm flour failed to prevent the gummy mouthfeel generated by 6 SKB units of alpha-amylase per 100 gms flour. In any event, bread made with 6 SKB units per 100 gms of flour should be caught by the usual quality controls of the bakery.

Enzymes—The Alpha-Amylase

The baking art generally classify alpha-amylases according to the source thereof, as bacterial, fungal and cereal. By and large, the fungal amylases exhibit relatively low thermal stability, being deactivated rapidly at above 65° C., and are not contemplated for practice of this invention. Cereal and bacterial alpha-amylases are contemplated, with the bacterial alpha-amylases being preferred. Both exhibit thermal stability adequate for practice of this invention. Malt is a typical cereal alpha-amylase.

The prior art already alluded to, suggests employment of bacterial alpha-amylase, i.e., 2,615,810 and 3,026,205, predates a great expansion in the enzymology arts. Then only a limited number of bacterial alpha-amylases were available commercially, notably the alpha-amylase from *Bacillus subtilis* e.g., BAN ™. Additional suitable bacterial alpha-amylases have since become available, e.g., the alpha-amylase from *Bacillus licheniformis*, sold as Termamyl ®. In addition, other activity units besides the SKB unit employed by enzymologists are in common practice. For example, the alpha-amylase from *Bacillus subtilis*, is not always sold in SKB units. BAN ®, for example, being available in KNU unit concentrations. It is noted that 19 SKB units is about equal to 1 KNU.

The particular starch debranching enzyme contemplated for practice of this invention are pullulanases.

Other starch debranching enzymes are known to the art, notably isoamylases. The various debranching enzymes are characterized and distinguished by their action toward various alpha 1,4-1,6 glucose polymers. Isoamylases, for example, optimally hydrolyze amylopectin. Amylopectin is a very high molecular weight polymer containing an alpha-1,6 branch point every 15–25 glucose units. The concepts underlying practice of this invention are inconsistent with inclusion of a subsidiary enzyme capable of rapid attack upon largely intact amylopectin. Therefore, use of isoamylose is not contemplated in practice of this invention.

On the other hand, pullulanases attack pullulan at maximal rate, but intact amylopectin is hydrolyzed rather slowly. Pullulan is a polymer of alpha 1,6 linked maltotriose with some maltotetraose units. Thus, pullulanases readily hydrolyze DP 10-100 branched dextrins produced upon hydrolysis of amylopectin by the amylase yet have limited effect on amylopectin itself. Accordingly, pullulanase becomes particularly effective when the DP 10-100 branched chain dextrins are disproportionately concentrated through presence of more alpha amylase in the dough than is necessary, e.g., 3 or 4 SKB units. When 2 SKB or less alpha amylase has been used, presence of the pullulanase is without material consequence to the bread crumb.

The preferred pullulanase for practice of this invention is Promozyme TM, which is the pullulanase described in Ser. No. 434,745, filed Oct. 18, 1982 now U.S. Pat No. 4,560,651. This enzyme is elaborated by *Bacillus acidopullulyticus*.

Mention has been made that employment of pullulanase along with a cereal enzyme, notably malt is contemplated for practice of this invention. Bakers have long been adding malt to bread dough, although they have largely declined, heretofore, to employ bacterial alpha-amylase. In consequence, bakers are familiar with the results from addition of too much malt to the dough, namely generation of "over malted bread." Over malted bread is prevented by addition of debranching enzyme in the above given range of 10-50 PUN per 100 gms of flour in the malted dough.

For further understanding of this invention, the following Examples are presented.

EXAMPLE 1

Standard baking ingredients and methods (according to American Institute of Baking Practices) were employed to make loaves of white pan bread in a $3^2$ factorial study at 0, 3 and 6 SKB units of alpha-amylase per 100 gms of flour and 0, 20, 40 PUN of a pullulanase per 100 gms of flour.

Commercially available alpha-amylase and pullulanase enzymes were employed, respectively, BAN TM 120L and Promozyme TM 200L (from NOVO INDUSTRI A/S).

On days 1, 3, 5 and 7, loaves of bread were tested for softness using a Universal Instron testing machine. Sensory evaluations were performed on days 1, 6, 8 and the bread was rated for external appearance and internal characteristics. (A score less than 65 in any one parameter on a 1-100 scale was considered undesirable.)

Proof time, loaf moisture and specific load volume were also measured.

RESULTS

Effect of Promozyme TM and BAN TM on Proof Time, Loaf Moisture and Specific Loaf Volume Additions of either enzyme to the bread dough did not change the proof time, loaf moisture and specific load volume. The proofing time for the loaves to reach a set height was within the acceptable range for all the loaves treated with Promozyme TM and/or BAN TM. The initial moisture content of bread varied slightly, but all the loaves lost approximately the same amount of moisture during seven days of storage at 75° F.

Effect of Promozyme TM and BAN TM on Staling Rate

The results show that treatment with the BAN TM alone will retard staling in bread whereas Promozyme TM alone shows no antistaling effect. Further, the analysis of variances (SAS System) indicated some interaction effect of Promozyme TM and BAN TM on bread softness.

Treatment with BAN TM significantly affects bread softness. The BAN TM treated bread was softer. This BAN TM effect depends on the enzyme doses. Initially, on Day 1 the control bread (without enzymes) and bread treated with BAN TM produced similar crumb softness. However, after three days storage, bread treated with BAN TM kept soft and moist; the control bread was 50% firmer. This BAN TM antistaling effect emerged on the third day which suggests that the effect was due to residual alpha-amylase activity in the crumb.

Further, the firming of the control bread increased during storage. On the 7th day, the compressimeter readings of control bread were double the bread treated with BAN TM at 6 SKB units/100 g flour. The bread treated with BAN TM at 3 units/100 g flour stayed moist and soft over this 7 day period. In addition, bread treated with BAN TM at 6 SKB units/100 g flour gave the lowest compressimeter readings (76-110) over a 7 day period.

Promozyme TM alone did not have an anti-staling effect. Bread treated with Promozyme TM became stale rapidly. Promozyme TM treated bread has similar compressimeter readings as to the control bread (without addition of enzymes).

The results from Instron press test alone do not advise whether bread is acceptable to consumers. Sensory evaluations help to predict consumer's reaction. Therefore, sensory evaluations were made.

Effect of Promozyme TM and BAN TM on the Sensory Characteristics of Bread

Crust color, character of crust, color of crumb, aroma and taste of bread did not change with the addition of Promozyme TM and/or BAN TM. Further, the break and shred scores were within the acceptable range except for the grain sizes. Bread treated with BAN TM at 6 SKB units/100 g flour with or without Promozyme TM possessed poor grains. These grains were open, coarse, with large holes and thick walls.

Bread treated with BAN TM at 3 SKB units/100 g flour plus Promozyme TM at 20 PUN/100 g flour produced the best results. This bread had the longest shelf-life and stayed moist and soft during storage with good mouthfeel. On the other hand, the bread treated with BAN TM alone at 3 SKB units/100 g flour seemed to have a slight gumminess texture, yet it alone was still rated as acceptable bread by the experts. The added presence of Promozyme TM seemed to eliminate this gumminess.

Futher, BAN TM at 6 SKB units/100 g flour with either 20 or 40 PUN/100 g flour of Promozyme TM produced bread that received low sensory scores. The bread has a gummy texture right after it was baked. In this instance, the Promozyme TM dose was too low and was not able to eliminate the gummy mouthfeel caused by this high dose of BAN TM.

EXAMPLE 2

A second study was made with the same materials, equipment and practices described in Example 1, at dosages for the BAN TM of 1, 2, 3, 4, 5, and 6 SKB units/100 gm flour and for the Promozyme TM of 50, 100, 150 PUN/100 gm flour.

The softness tests (Instron) were conducted on days 1, 3, 6 and 9; sensory evaluations were performed on days 1, 3, 6 and 9 as well.

Effect of Promozyme TM and BAN TM on Proof Time, Loaf Moisture and Specific Loaf Volume Additions of Promozyme TM and/or BAN TM to dough did not significantly affect the proof time, loaf moisture or specific load volume. The proof time for the loaves to reach a set height was within the acceptable range for all loaves. All loaves tested lost approximately the same amounts of moisture except the control bread (without enzymes addition). The control bread lost 4% more moisture than enzyme treated bread. The specific loaf volume varied slightly and all loaves had a specific loaf volume of slightly lower than usual. However, the addition of enzymes did not seem to significantly change the specific loaf volume.

Effect of Promozyme TM on Bread Gumminess

Bread without the addition of enzymes was firm throughout the study, as measured by the Instron press test. The bread had an unacceptable firm texture after six days storage, very harsh, crumbly and rigid.

The addition of BAN TM at 6 SKB units/100 g flour produced a gummy unacceptable bread from Day 1 onward. However, the data shows that Promozyme TM at 50 PUN/100 g flour prevented bread gumminess caused by the addition of this quality of BAN TM. The bread treated with Promozyme TM (50 PUN/100 g flour) plus BAN TM (6 SKB Units/100 g flour) was judged to be the best bread. This bread stayed fresh after nine days storage at 75° F.

Promozyme TM lost its ability to prevent gumminess at higher dose levels. Bread treated with Promozyme TM at 100 PUN/100 g flour and 6 SKB of BAN TM became gummy after three days storage at 75° F. When the Promozyme TM dose was increased to 150 PUN/100 g flour, the bread turned gummy more rapidly, i.e., in the first day of storage. This study indicates existence of an effective range for the debranching enzyme relative to the alpha-amylase.

Effect of BAN TM on Staling Rate

The addition of BAN TM in bread dough produces a softer crumb. The higher dose levels of BAN TM produce bread with increasing crumb softness. The addition of BAN TM at 1 and 2 SKB units/100 g flour produced the best bread.

Treatment with BAN TM at 3 SKB units/100 g flour produced gummy bread by the third day of storage. Bread became gummy even faster (in Day 1) when dose levels were increased. For example, when the dough was treated with >5 SKB units/100 g flour, bread became gummy after only one day storage.

CONCLUSION

White pan bread without the additin of enzymes becomes stale and undesirable after six days storage at 75° F. When bread is treated with BAN TM at <4 SKB units/100 g flour, the staling process is retarded. The addition of higher doses of BAN TM (>5 SKB units/100 g flour) in dough produces a softer crumb but it is undesirable because of gumminess. However, the addition of Promozyme TM (20–50 PUN/100 g flour) to dough will prevent the gumminess caused by the addition of BAN TM.

We claim:

1. In the process of making bakery products having retarded staling qualities through addition of bacterial or cereal alpha-amylase levels of 0.25–5 SKB units/100 grams of flour, the improvement which comprises incorporating per 100 grams of flour about 10–50 PUN of a pullulanase.

2. The process of claim 1 further comprising addition of a *Bacillus subtilis* alpha-amylase preparation.

3. The process of claim 2 further comprising addition of a *Bacillus acidopullulyticus* pullulanse preparation.

4. A method for preventing over malted bread which comprises adding about 10–50 PUN of a debranching enzyme per 100 gms of flour to a malt-containing dough.

* * * * *